United States Patent
Johnson et al.

(10) Patent No.: US 12,012,123 B2
(45) Date of Patent: Jun. 18, 2024

(54) METHOD AND SYSTEM FOR IMPACT-BASED OPERATION OF AN AUTONOMOUS AGENT

(71) Applicant: May Mobility, Inc., Ann Arbor, MI (US)

(72) Inventors: Collin Johnson, Ann Arbor, MI (US); Yash Bagla, Ann Arbor, MI (US); Kapil Borle, Ann Arbor, MI (US); Akshay Katpatal, Ann Arbor, MI (US); Mahmood Mahmood, Ann Arbor, MI (US); Edwin B. Olson, Ann Arbor, MI (US)

(73) Assignee: May Mobility, Inc., Ann Arbor, MI (US)

(*) Notice: Subject to any disclaimer, the term of this patent is extended or adjusted under 35 U.S.C. 154(b) by 0 days.

(21) Appl. No.: 18/072,939

(22) Filed: Dec. 1, 2022

(65) Prior Publication Data

US 2023/0166764 A1   Jun. 1, 2023

Related U.S. Application Data

(60) Provisional application No. 63/285,024, filed on Dec. 1, 2021.

(51) Int. Cl.
*B60W 50/00* (2006.01)
*B60W 40/04* (2006.01)
(Continued)

(52) U.S. Cl.
CPC ........ *B60W 60/0011* (2020.02); *B60W 40/04* (2013.01); *B60W 50/0097* (2013.01);
(Continued)

(58) Field of Classification Search
CPC ............ B60W 60/0011; B60W 40/04; B60W 50/0097; B60W 2050/0028; B60W 2554/80; B60W 60/0027
See application file for complete search history.

(56) References Cited

U.S. PATENT DOCUMENTS

| | | |
|---|---|---|
| 5,544,282 A | 8/1996 | Chen et al. |
| 6,199,013 B1 | 3/2001 | Oshea |

(Continued)

FOREIGN PATENT DOCUMENTS

| | | |
|---|---|---|
| JP | 2011100492 A | 5/2011 |
| JP | 2015083417 A | 4/2015 |

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).

(Continued)

*Primary Examiner* — Donald J Wallace
*Assistant Examiner* — Daniel M. Robert
(74) *Attorney, Agent, or Firm* — Jeffrey Schox; Caitlin Ploch

(57) ABSTRACT

A system for impact-based operation of an autonomous agent (equivalently referred to herein as an ego agent and autonomous vehicle) includes and/or interfaces with a computing subsystem (equivalently referred to herein as a computer and/or set of computers). A method for impact-based operation of an autonomous agent includes: receiving a set of inputs; predicting a set of future scenarios; and determining a set of metrics based on the set of future scenarios.

(Continued)

Additionally or alternatively, the method can include operating the autonomous agent based on the set of metrics and/or any other processes.

20 Claims, 11 Drawing Sheets

(51) Int. Cl.
  *B60W 60/00* (2020.01)
  *G05D 1/00* (2006.01)
(52) U.S. Cl.
  CPC ... *B60W 2050/0028* (2013.01); *B60W 60/005* (2020.02); *B60W 60/0055* (2020.02); *B60W 2554/80* (2020.02); *G05D 1/0061* (2013.01)

(56) References Cited

U.S. PATENT DOCUMENTS

| | | |
|---|---|---|
| 9,129,519 B2 | 9/2015 | Aoude et al. |
| 9,274,525 B1 | 3/2016 | Ferguson et al. |
| 9,368,026 B1 | 6/2016 | Herbach et al. |
| 9,495,874 B1 | 11/2016 | Zhu et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,156,848 B1 | 12/2018 | Konrardy et al. |
| 10,235,882 B1 | 3/2019 | Aoude et al. |
| 10,248,120 B1 | 4/2019 | Siegel et al. |
| 10,386,856 B2 | 8/2019 | Wood et al. |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,796,581 B2 | 10/2020 | Herbach et al. |
| 10,860,019 B2 | 12/2020 | Censi et al. |
| 10,969,470 B2 | 4/2021 | Voorheis et al. |
| 11,086,318 B1 | 8/2021 | Davis et al. |
| 11,242,054 B2 | 2/2022 | Isele |
| 11,260,855 B2 | 3/2022 | Zhang |
| 11,300,957 B2 | 4/2022 | Wray et al. |
| 11,352,023 B2 | 6/2022 | Fairley et al. |
| 11,396,302 B2 | 7/2022 | Ye et al. |
| 11,496,707 B1 | 11/2022 | Crego et al. |
| 11,565,717 B2 | 1/2023 | Kothbauer et al. |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2010/0114554 A1 | 5/2010 | Misra |
| 2010/0204867 A1 | 8/2010 | Longstaff |
| 2010/0228419 A1* | 9/2010 | Lee ................... B62D 15/0255 701/25 |
| 2011/0142283 A1 | 6/2011 | Huang et al. |
| 2012/0089275 A1 | 4/2012 | Yao-Chang et al. |
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0277835 A1* | 9/2014 | Filev ....................... G06F 17/00 701/2 |
| 2014/0309815 A1 | 10/2014 | Ricci et al. |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2017/0031361 A1 | 2/2017 | Olson et al. |
| 2017/0032671 A1 | 2/2017 | Toyama et al. |
| 2017/0072853 A1 | 3/2017 | Matsuoka et al. |
| 2017/0123419 A1 | 5/2017 | Levinson et al. |
| 2017/0155696 A1 | 6/2017 | Dong et al. |
| 2017/0199523 A1 | 7/2017 | Barton-Sweeney et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0291602 A1* | 10/2017 | Newman ................ G08G 1/166 |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Iagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0065625 A1 | 3/2018 | Tijerina et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0220283 A1 | 8/2018 | Condeixa et al. |
| 2018/0224851 A1 | 8/2018 | Park |
| 2018/0251126 A1 | 9/2018 | Linscott et al. |
| 2018/0267550 A1 | 9/2018 | Kopetz et al. |
| 2018/0268281 A1 | 9/2018 | Olson et al. |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0027034 A1 | 1/2019 | Xu et al. |
| 2019/0039545 A1 | 2/2019 | Kumar et al. |
| 2019/0066399 A1 | 2/2019 | Jiang et al. |
| 2019/0096244 A1 | 3/2019 | Guruva Reddiar et al. |
| 2019/0101914 A1 | 4/2019 | Coleman et al. |
| 2019/0101919 A1 | 4/2019 | Kobilarov et al. |
| 2019/0106117 A1 | 4/2019 | Goldberg |
| 2019/0113919 A1 | 4/2019 | Englard et al. |
| 2019/0113929 A1 | 4/2019 | Mukadam et al. |
| 2019/0138524 A1 | 5/2019 | Singh et al. |
| 2019/0147610 A1 | 5/2019 | Frossard et al. |
| 2019/0180529 A1 | 6/2019 | Smith |
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0256096 A1* | 8/2019 | Graf ....................... G08G 1/0129 |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271554 A1 | 9/2019 | Colgate et al. |
| 2019/0271981 A1 | 9/2019 | Oba |
| 2019/0329771 A1 | 10/2019 | Wray et al. |
| 2019/0331758 A1 | 10/2019 | Malkes et al. |
| 2019/0332106 A1 | 10/2019 | Belloni Mourao et al. |
| 2019/0337509 A1 | 11/2019 | Shalev-Shwartz et al. |
| 2020/0004241 A1 | 1/2020 | Levinson et al. |
| 2020/0017114 A1 | 1/2020 | Santoni et al. |
| 2020/0020226 A1 | 1/2020 | Stenneth et al. |
| 2020/0026286 A1 | 1/2020 | Vozar et al. |
| 2020/0057441 A1 | 2/2020 | Wang et al. |

(56) References Cited

U.S. PATENT DOCUMENTS

| | | |
|---|---|---|
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0122830 A1 | 4/2020 | Anderson et al. |
| 2020/0124447 A1 | 4/2020 | Schwindt et al. |
| 2020/0159227 A1 | 5/2020 | Cohen et al. |
| 2020/0189731 A1 | 6/2020 | Mistry et al. |
| 2020/0209853 A1 | 7/2020 | Leach et al. |
| 2020/0209864 A1 | 7/2020 | Chen |
| 2020/0233060 A1 | 7/2020 | Lull et al. |
| 2020/0255027 A1 | 8/2020 | Kulkarni et al. |
| 2020/0262448 A1 | 8/2020 | Li et al. |
| 2020/0269843 A1 | 8/2020 | Wissing et al. |
| 2020/0290619 A1 | 9/2020 | Mehdi et al. |
| 2020/0293041 A1 | 9/2020 | Palanisamy |
| 2020/0294401 A1 | 9/2020 | Kerecsen |
| 2020/0309543 A1 | 10/2020 | Voznesensky |
| 2020/0339151 A1 | 10/2020 | Batts et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0400781 A1 | 12/2020 | Voorheis et al. |
| 2021/0042535 A1 | 2/2021 | Abbott et al. |
| 2021/0046924 A1* | 2/2021 | Caldwell ........... B60W 30/0956 |
| 2021/0110484 A1* | 4/2021 | Shalev-Shwartz .... B60W 10/18 |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0208244 A1 | 7/2021 | Voorheis et al. |
| 2021/0229697 A1 | 7/2021 | Lee et al. |
| 2021/0245785 A1 | 8/2021 | Suzuki et al. |
| 2021/0252715 A1* | 8/2021 | Javidan ................ H04W 4/023 |
| 2021/0269063 A1 | 9/2021 | Lee et al. |
| 2021/0286651 A1 | 9/2021 | Ho et al. |
| 2021/0339741 A1 | 11/2021 | Rezvan Behbahani et al. |
| 2021/0365701 A1 | 11/2021 | Eshet et al. |
| 2021/0389769 A1 | 12/2021 | Hari et al. |
| 2021/0394757 A1* | 12/2021 | Beller ............. B60W 30/18159 |
| 2022/0032951 A1* | 2/2022 | Luo ................... B60W 60/0011 |
| 2022/0076032 A1 | 3/2022 | Jain et al. |
| 2022/0081005 A1 | 3/2022 | Brown et al. |
| 2022/0119006 A1 | 4/2022 | Ariyaratne et al. |
| 2022/0126878 A1 | 4/2022 | Moustafa et al. |
| 2022/0161811 A1* | 5/2022 | Lu .................... B60W 60/0059 |
| 2022/0185325 A1 | 6/2022 | Chen et al. |
| 2022/0198107 A1 | 6/2022 | Pedersen |
| 2022/0204010 A1 | 6/2022 | Zhu et al. |
| 2022/0315051 A1 | 10/2022 | Patel et al. |
| 2023/0144745 A1 | 5/2023 | Ulutan et al. |
| 2023/0174103 A1 | 6/2023 | Patel et al. |
| 2024/0067208 A1 | 2/2024 | Shim et al. |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |

OTHER PUBLICATIONS

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes for Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing the Effect of Pruning on a Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Mehta, Dhanvin, et al., "Fast discovery of influential outcomes for risk-aware MPDM", Oct. 2016; sections I. Introduction; IV. Navigation Policies; V. Multi-Policy Decision Making; V.A. The Cost Function; pp. 3-4.

Crossman, Jacob, et al., "Method and System for Assessing and Mitigating Risks Encounterable by an Autonomous Vehicle", U.S. Appl. No. 18/538,312, filed Dec. 13, 2023.

* cited by examiner

METHOD AND SYSTEM FOR IMPACT-BASED OPERATION OF AN AUTONOMOUS AGENT

CROSS-REFERENCE TO RELATED APPLICATIONS

This application claims the benefit of U.S. Provisional Application No. 63/285,024, filed 1 Dec. 2021, which is incorporated in its entirety by this reference.

TECHNICAL FIELD

This invention relates generally to the autonomous vehicle field, and more specifically to a new and useful system and method for impact-based operation of an autonomous agent in the autonomous vehicle field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
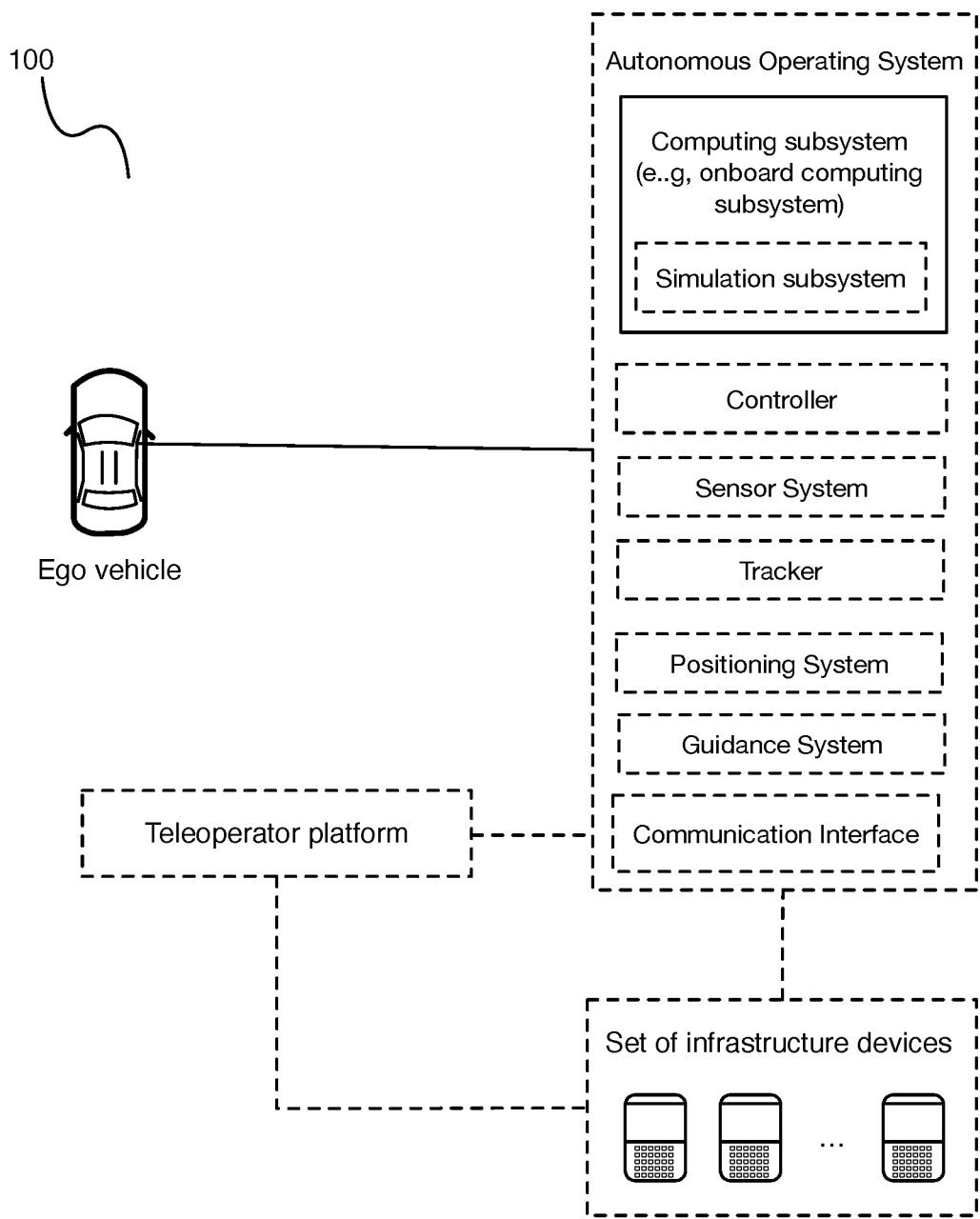
FIG. 1 is a schematic of a system for impact-based operation of an autonomous agent.

As shown in FIG. 1, a system 100 for impact-based operation of an autonomous agent (equivalently referred to herein as an ego agent and autonomous vehicle) includes and/or interfaces with a computing subsystem (equivalently referred to herein as a computer and/or set of computers). Additionally or alternatively, the system 100 can include and/or interface with an autonomous agent (equivalently referred to herein as an ego agent), one or more sets of sensors (e.g., onboard the ego agent, onboard a set of infrastructure devices, etc.), and/or any other components. Further additionally or alternatively, the system can include any or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; and U.S. application Ser. No. 17/826,655, filed 27 May 2022; each of which is incorporated in its entirety by this reference.

Figure 2:
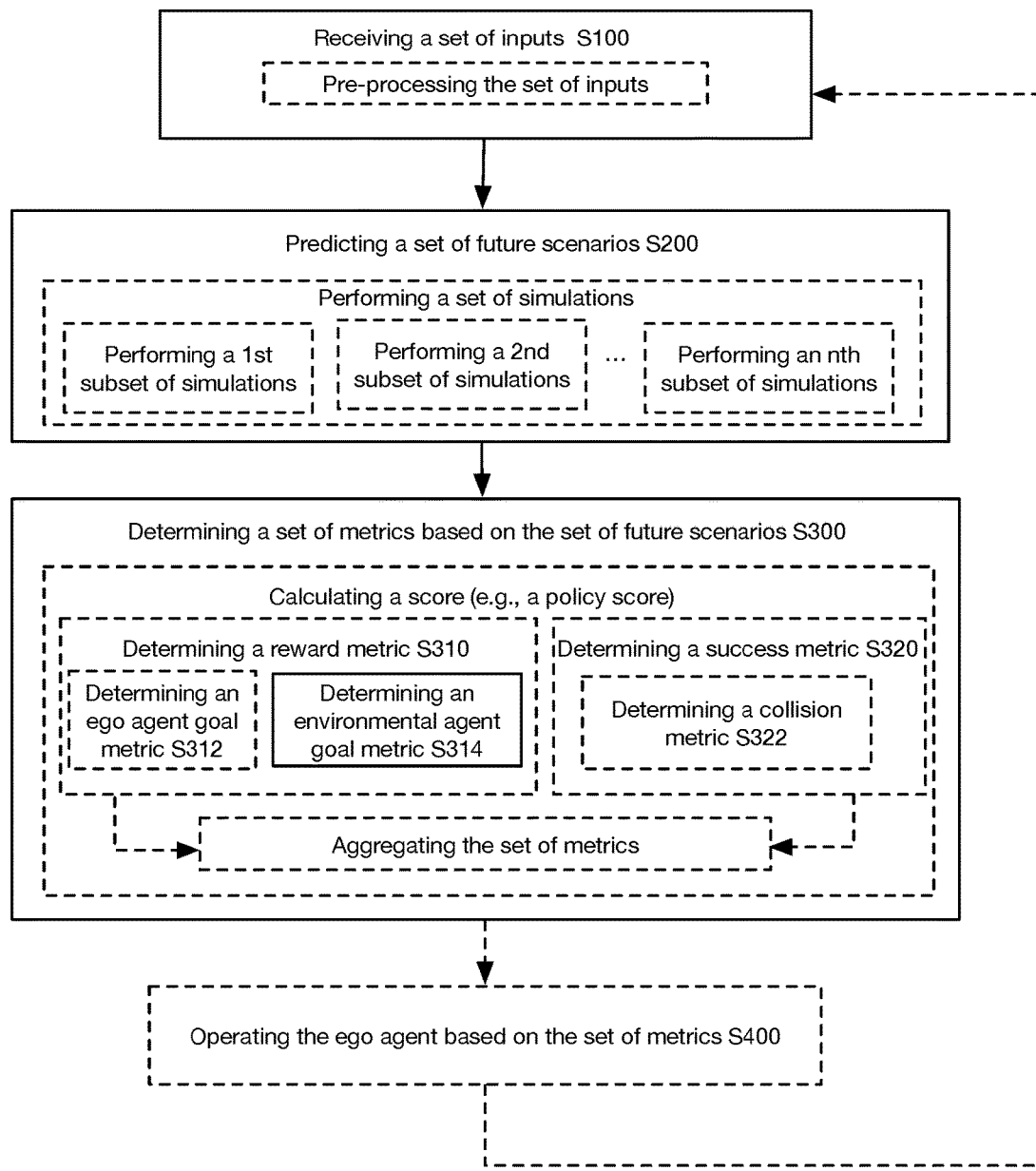
FIG. 2 is a schematic of a method for impact-based operation of an autonomous agent.
Figure 3A:
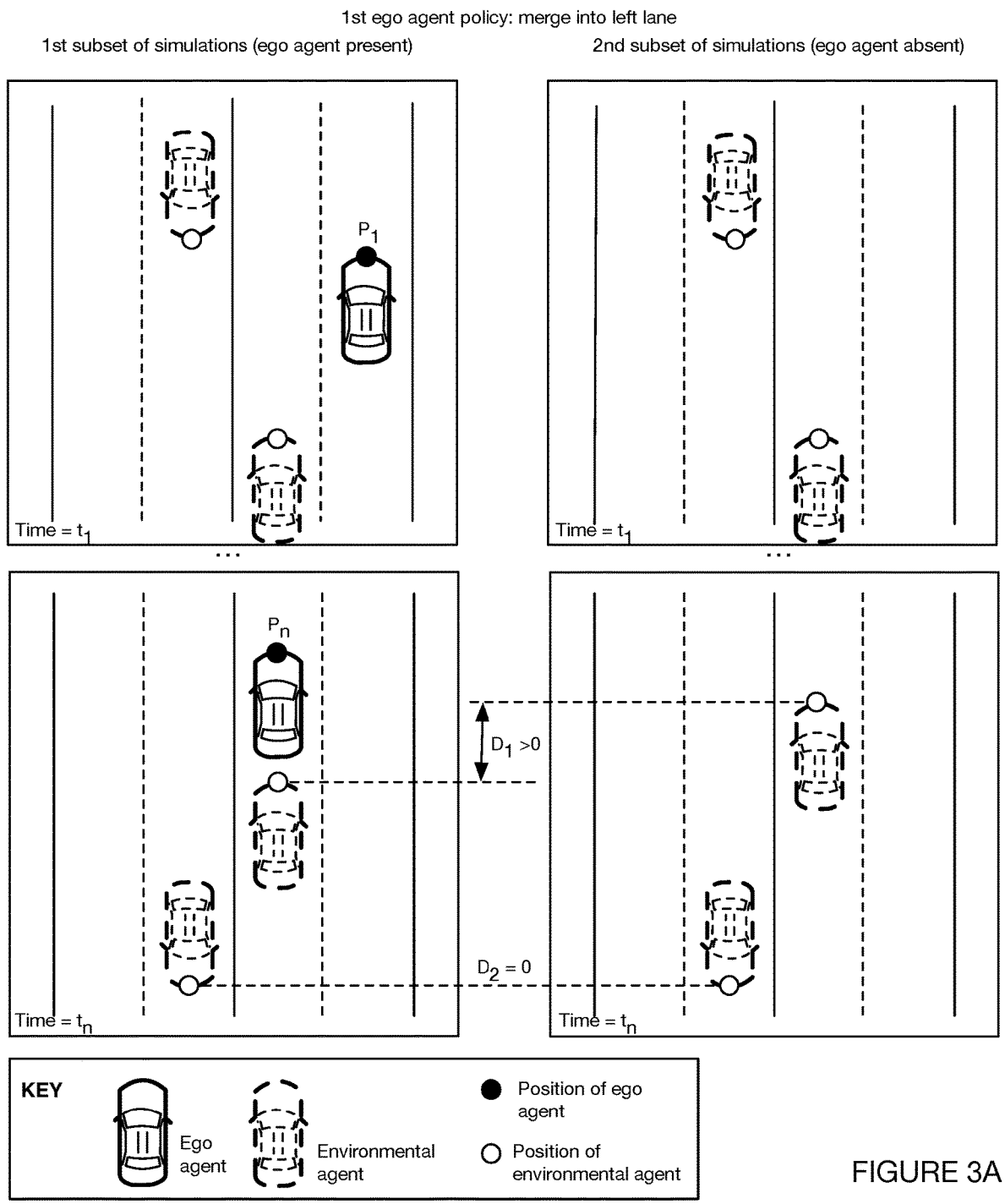
FIGS. 3A-3B depict a variant of the method for impact-based operation of an autonomous agent.
Figure 3B:
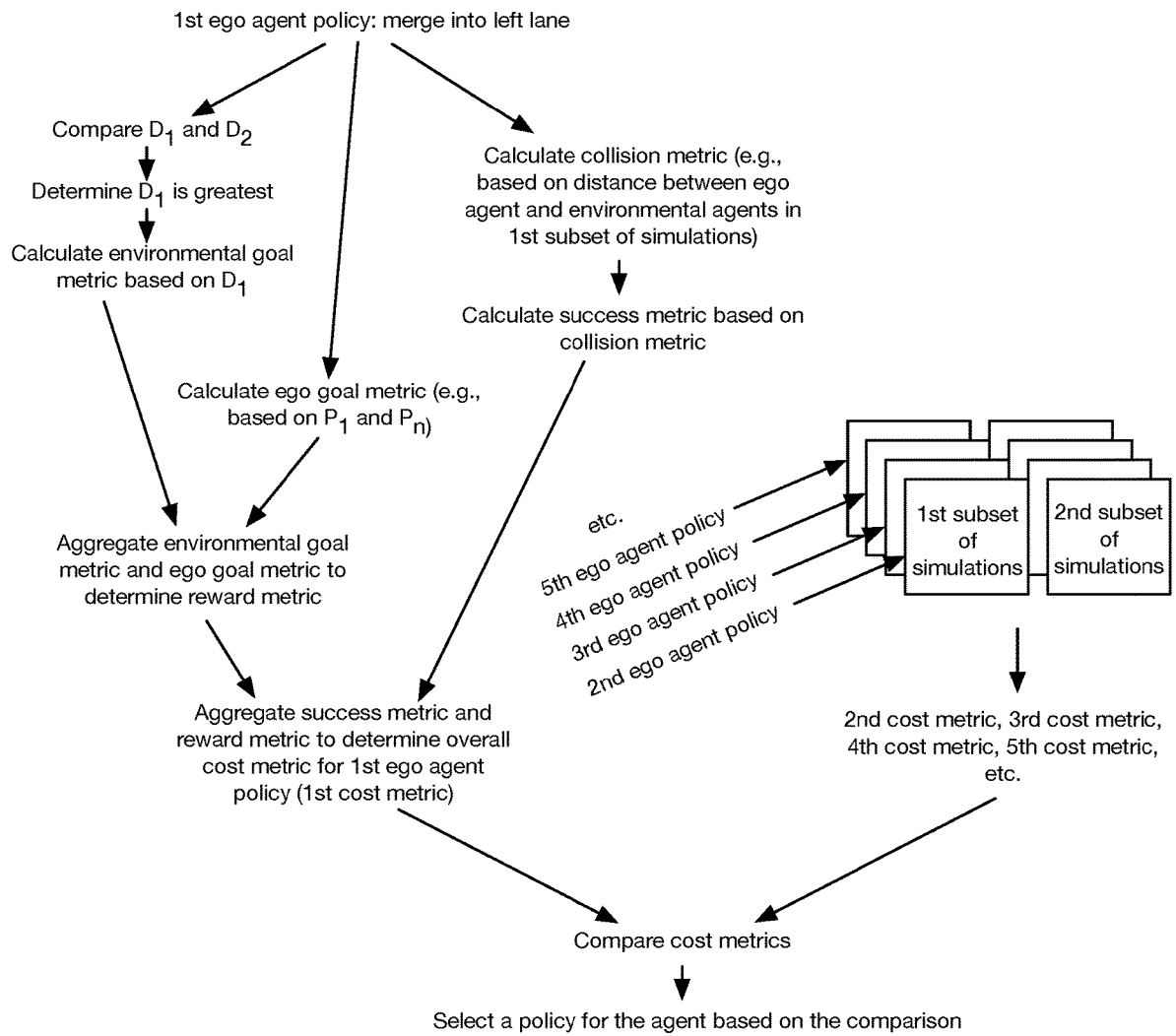

As shown in FIG. 2, a method 200 for impact-based operation of an autonomous agent includes: receiving a set of inputs S100; predicting a set of future scenarios S200; and determining a set of metrics based on the set of future scenarios S300. Additionally or alternatively, the method 200 can include operating the ego agent based on the set of metrics S400 and/or any other processes. Further additionally or alternatively, the method 200 can include and/or interface with any or all of the methods, processes, embodiments, and/or examples as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; and U.S. application Ser. No. 17/826,655, filed 27 May 2022; each of which is incorporated in its entirety by this reference, or any other suitable processes performed in any suitable order.

The method 200 can be performed with a system 100 as described above and/or with any other suitable system.

2. Benefits

The system and method for impact-based operation of an autonomous agent can confer several benefits over current systems and methods.

In a first variation, the technology confers the benefit of evaluating the potential effects of the ego agent's driving behavior on other agents sharing the road with the ego agent, such that policies (e.g., behaviors, actions, movements, maneuvers, etc.) can be selected for the ego agent which take into account these effects and promote considerate driving by the ego agent. This can, in turn, prevent the ego agent from performing actions which would annoy or otherwise cause the other agents to react negatively to the ego agent (or in a dangerous manner), thereby increasing acceptance of the ego agents on the road.

In a second variation, additional or alternative to the first, the technology confers the benefit of enabling a prediction of how other agents on the road are driving and how they might react to future actions of the ego agent. In specific examples, this is enabled through a set of closed loop simulations, which forward simulate the driving behaviors of these other agents together with the ego agent.

In examples, at least two types and/or categories of simulations are performed, wherein the types of simulations differ with respect to which objects are simulations and/or which objects are not simulated. In specific examples, in a first type of simulation, the ego agent is present with environmental agents, whereas in a second type of simulation, only the environmental agents are simulated (the ego agent is removed from the scene), where this combination of simulation types confers the benefit of enabling the difference (e.g., decrease, hindrance, etc.) in progression of the environmental agents which is directly attributable to the ego agent to be determined.

In a third variation, additional or alternative to those described above, the technology confers the benefit of predicting an impact of the ego agent with a metric which is particularly well suited for easy use, such as a metric which is configured for any or all of: comparison among multiple different types of agents, the linear scaling of another metric in the determination of a reward function, representing a common goal among agents, and/or any other benefits.

In a first set of examples, a metric used to assess the impact includes a difference in modified energy and/or work associated with the scene and its environmental agents, which is able to meaningfully reflect how much energy and work is required to be exerted by environmental agents in response to certain behaviors of the ego agent. These metrics can further be easily aggregated (e.g., summed, work and energy aggregated together since they share the same units, etc.), assessed, compared, and/or otherwise efficiently used.

In a second set of examples, additional or alternative to the above, the metric used to assess the impact includes a difference and/or ratio of the distance that the environmental agent could progress without the ego agent executing a proposed policy relative to the distance that the environmental agent could progress with the ego agent executing the proposed policy, which can be applied to all agents (e.g., vehicles, pedestrians, etc.) and used to scale a reward function related to the ego agent's progress toward a goal.

Additionally or alternatively, the system and method can confer any other benefit.

3. System

As shown in FIG. 1, a system 100 for impact-based operation of an autonomous agent includes and/or interfaces with a computing subsystem (equivalently referred to herein as a computer), wherein the computing subsystem includes and/or interfaces with a simulator subsystem (e.g., simulator module, simulation program, simulator, etc.) and/or is otherwise configured to perform and/or trigger the performance of a set of simulations (e.g., as described below). The system 100 further preferably includes and/or interfaces with the autonomous agent (equivalently referred to herein as an ego agent and/or autonomous vehicle and/or ego vehicle), one or more sets of sensors (e.g., onboard the ego agent, onboard a set of infrastructure devices, etc.), and/or any other components. Additionally or alternatively, the system can include or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; and U.S. application Ser. No. 17/826,655, filed 27 May 2022; each of which is incorporated in its entirety by this reference.

The system 100 preferably includes and/or interfaces with (e.g., is integrated within) an autonomous vehicle (equivalently referred to herein as an autonomous agent, agent, and/or ego agent). The autonomous agent is preferably an autonomous vehicle, further preferably a fully autonomous vehicle and/or a vehicle able to be operated as a fully autonomous vehicle, but can additionally or alternatively be a semi-autonomous vehicle and/or any other vehicle.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The autonomous agent preferably includes and/or interfaces with a computing subsystem, wherein the computing subsystem functions to process information (e.g., sensor inputs) and perform the processing and decision making for operation of the ego agent. This can include, for instance, determining any or all of: a series of policies (e.g., behaviors, actions, high-level behaviors and/or plans, etc.) for the ego agent to execute, a behavior and/or action for the vehicle to execute, a trajectory for the ego agent to execute, a set of control commands for the vehicle (e.g., actuation subsystem, steering subsystem, braking subsystem, acceleration subsystem, etc.) to execute, and/or any other information. Additionally or alternatively, the computing subsystem can function to perform any or all of the processes involved in any or all of: perception, prediction, localization, planning, and/or any other processes involved in operation of the autonomous agent.

The computing system preferably includes an onboard computing subsystem arranged onboard (e.g., integrated within) the ego agent. Additionally or alternatively, the computing system can include any or all of: a remote computing subsystem (e.g., cloud computing system, remote computing in communication with an onboard computing system, in place of an onboard computing system, etc.), a computing subsystem integrated in a supplementary device (e.g., mobile device, user device, etc.), an edge device including mobile computing devices, and/or any other suitable computing subsystems and devices. In some variations, for instance, the ego agent is operable in communication with a remote or disparate computing system that may include a user device (e.g., a mobile phone, a laptop, etc.), a remote server, a cloud server, or any other suitable local and/or distributed computing system remote from the vehicle. The remote computing subsystem can be connected to one or more systems of the autonomous agent through one or more data connections (e.g., channels), but can alternatively communicate with the vehicle system in any suitable manner.

The computing subsystem can include and/or interface with a processing subsystem (e.g., processor or set of processors, graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory.

In some variations, for instance, the onboard computing subsystem functions to interact with and/or operably control any one or more of the identified components or modules described herein. In preferred variations, for instance, the onboard computing subsystem executes computer instructions for implementing a multi-policy decisioning module. In specific examples, the processing system and memory collectively function to dynamically manage the set of policies available to the autonomous agent in the framework of a multi-policy decision making framework, such as that described in any or all of: U.S. application Ser. No. 16/514,624, filed 17 Jul. 2019, and U.S. application Ser. No. 17/365,538, filed 1 Jul. 2021, each of which is incorporated herein in its entirety by this reference. Additionally or alternatively, the processing system and memory, and/or any other suitable components, can be used for any other suitable functions.

The computing subsystem preferably includes interfaces with, and/or is configured to perform processes in conjunction with a simulator subsystem (equivalently referred to herein as a simulation subsystem) of the system, wherein the simulator subsystem functions to perform a set of simulations (e.g., as described below), wherein the set of simulations function to predict future scenarios associated with the ego agent and environmental agents (e.g., other vehicles, pedestrians, dynamic and/or static objects, etc.) in its environment (e.g., in the ego agent's surroundings, within a field of view of the ego agent's sensors, within a predetermined radius relative to the ego agent, etc.). Additionally or alternatively, the simulator subsystem can perform any other functions.

The simulator subsystem preferably includes a simulation program (e.g., simulation module, simulation software, programmed language, software script and/or programmed commands, etc.) executable by the computing subsystem, but can additionally or alternatively include any other components and/or be executable by any other components.

The simulator subsystem is preferably configured to perform forward simulations, which function to predict and analyze how the ego agent's environment will evolve in the future (e.g., to a predetermined time within the future) based on the ego agent's current and/or historical understanding of its environment (e.g., current positions of the ego agent and environmental agents, historical positions of the ego agent and the environmental agents, current and/or historical information motion information associated with the ego agent and/or environmental agents). In a preferred set of variations, for instance, throughout operation of the autonomous vehicle—such as, but not limited to, continuously, at a predetermined frequency (e.g., between every tenth of a second and every second, at least every second, at least every 5 seconds, between every millisecond and every second, etc.), at a predetermined set of intervals, upon the collection of new sensor information, etc.—a set of simulations is performed, which forward simulate the vehicle's environment into the future (e.g., to a predetermined time into the future, at each of a set of predetermined time intervals for a predetermined time into the future, for between the next 1-10 seconds into the future, for less than 1 second into the future, for greater than 10 seconds into the future, for between the next 0.1-30 seconds into the future, for between the next 2-8 seconds into the future, etc.).

Additionally or alternatively, the simulator subsystem can perform any other simulations and/or types of simulations.

In specific examples, the multi-policy decision-making module includes and/or implements a simulator module or similar machine or system that functions to estimate future (i.e., steps forward in time) behavioral policies (operations or actions) for each of the environmental agents (e.g., other vehicles in an environment of the ego agent) and/or objects (e.g., pedestrians) identified in an operating environment of the autonomous agent (real or virtual) including potential behavioral policies that may be executed by the ego agent. The simulations may be based on a current state of each agent (e.g., the current hypotheses) and/or historical actions or historical behaviors of each of the agents derived from the historical data buffer (preferably including data up to a present moment). The simulations may provide data relating to interactions (e.g., relative positions, relative velocities, relative accelerations, etc.) between projected behavioral policies of each agent and the one or more potential behavioral policies that may be executed by the autonomous agent.

Additionally or alternatively, the simulation subsystem can be operated independently of and/or outside of a multi-policy decision-making module.

The system 100 can optionally include a communication interface in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

The system 100 can optionally include and/or interface with (e.g., receive information from) a set of infrastructure devices (e.g., as shown in FIG. 1), equivalently referred to herein as roadside units, which individually and/or collectively function to observe one or more aspects and/or features of an environment and collect observation data relating to the one or more aspects and/or features of the environment. The set of infrastructure devices are preferably in communication with an onboard computing system of the autonomous agent, but can additionally or alternatively be in communication with the tele-assist platform, any other components, and/or any combination.

The infrastructure devices preferably include devices in an immediate and/or close proximity or within short-range communication proximity to an operating position of an autonomous agent and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The system preferably includes and/or interfaces with a sensor suite (e.g., computer vision system, LIDAR, RADAR, wheel speed sensors, GPS, cameras, etc.), wherein the sensor suite (equivalently referred to herein as a sensor system) is in communication with the onboard computing system and functions to collect information with which to determine one or more trajectories for the autonomous agent. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite preferably includes sensors onboard the autonomous vehicle (e.g., RADAR sensors and/or LIDAR sensors and/or cameras coupled to an exterior surface of the agent, IMUs and/or encoders coupled to and/or arranged within the agent, audio sensors, proximity sensors, temperature sensors, etc.), but can additionally or alternatively include sensors remote from the agent (e.g., as part of one or more infrastructure devices, sensors in communication with the agent, etc.), and/or any suitable sensors at any suitable locations.

The sensors can include any or all of: cameras (e.g., visual range, multispectral, hyperspectral, IR, stereoscopic, etc.), LiDAR sensors, RADAR sensors, orientation sensors (e.g., accelerometers, gyroscopes, altimeters), acoustic sensors (e.g., microphones), other optical sensors (e.g., photodiodes, etc.), temperature sensors, pressure sensors, flow sensors, vibration sensors, proximity sensors, chemical sensors, electromagnetic sensors, force sensors, or any other suitable type of sensor.

In a preferred set of variations, the sensors include at least a set of optical sensors (e.g., cameras, LiDAR, etc.), and optionally any or all of: RADAR sensors, vehicle sensors (e.g., speedometers, orientation sensors, accelerometers, etc.), and/or any other sensors.

The system can optionally include and/or interface with a vehicle control subsystem including one or more controllers and/or control systems, which include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system 100 can include and/or interface with any other suitable components.

4. Method

As shown in FIG. 2, a method 200 for impact-based operation of an autonomous agent includes: receiving a set of inputs S100; predicting a set of future scenarios S200; and determining a set of metrics based on the set of future scenarios S300. Additionally or alternatively, the method 200 can include operating the ego agent based on the set of metrics S400 and/or any other processes. Further additionally or alternatively, the method 200 can include and/or interface with any or all of the methods, processes, embodiments, and/or examples as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; and U.S. application Ser. No. 17/826,655, filed 27 May 2022; each of which is incorporated in its entirety by this reference, or any other suitable processes performed in any suitable order.

The method 200 functions to determine and take into account the potential effect(s) (e.g., predicted effect) that an ego agent executing a certain policy (e.g., behavior, action, set of control commands, etc.) would have on other agents (equivalently referred to herein as environmental agents and tracked agents)—such as, but not limited to, other vehicles, cyclists, pedestrians, and/or any other dynamic or static objects—in the environment of the ego agent. This can, in turn, function to operate the ego agent in a way which is friendly to other drivers, pedestrians, and/or any other agents on or near the road. Environmental agents preferably include vehicles (e.g., human-driven vehicles, autonomous vehicles, bicycles, scooters, etc.) and pedestrians, but can additionally or alternatively include any other entities or objects.

In a preferred set of variations, for instance, the method 200 functions to continuously determine (e.g., through simulations) how current and/or future behaviors (e.g., policies) of the ego agent might impede progress and/or otherwise negatively affect other vehicles, pedestrians, cyclists, and/or other objects proximal to the ego agent, and incorporate this knowledge into the vehicle's decision making (e.g., policy selection).

Additionally or alternatively, the method 200 can perform any other functions.

4.1 Method—Receiving a Set of Inputs S100

The method 200 includes receiving a set of inputs S100, which functions to receive information with which to predict a set of future scenarios (e.g., perform a set of simulations) in S200. Additionally or alternatively, the set of inputs S100 can be used to determine a set of policy options (e.g., multiple potential policies) to be simulated for the ego agent, a set of policy options to be simulated for the environmental agents (e.g., to be simulated together with the policy options for the ego agent), and/or determine any other information for any other processes of the method 200.

S100 is preferably performed initially in the method 200 and further preferably multiple times (e.g., continuously, at a predetermined frequency, at a predetermined set of intervals, at dynamically determined intervals, etc.) during operation of the autonomous agent. In some variations, S100 is performed according to an election cycle (e.g., predetermined election cycle, predetermined frequency, etc.) during operation (e.g., during a trip) of the ego agent. The election cycle is preferably associated with a predetermined frequency (e.g., between once every 1-10 seconds, more than once per second, less than once every 10 seconds, etc.), but can additionally or alternatively be associated with a variable frequency and/or random intervals, performed in response to a trigger, and/or otherwise implemented. Additionally or alternatively, S100 can be performed in absence of an election cycle (e.g., in response to a trigger) and/or at any other times during the method 200.

The inputs preferably include information which can be used to detect a set of environmental objects arranged in an environment of the ego agent (e.g., within a field of view of sensors of the ego agent, within a predetermined distance of the ego agent, within a planning horizon of the ego agent, etc.).

The inputs can further optionally be used to determine features—such as the location, class (e.g., vehicle, pedestrian, etc.), motion, and/or any other features—of the environmental agents being tracked by the system, along with any or all of this information for the ego agent. Additionally or alternatively, the set of inputs can include information which characterizes features of the road or other landmarks/infrastructure (e.g., where lane lines are, where the edges of the road are, where traffic signals are and which type they are, where agents are relative to these landmarks, etc.) and/or any other information. The set of inputs can additionally or alternatively include any historical inputs and/or historical information (e.g., previous state estimates).

The inputs preferably include sensor inputs (e.g., camera streams, LiDAR data, RADAR data, etc.) received from a sensor suite onboard the ego agent, but can additionally or alternatively include historical information associated with the ego agent (e.g., historical state estimates of the ego agent) and/or environmental agents (e.g., historical state estimates for the environmental agents), sensor inputs from sensor systems offboard the ego agent (e.g., onboard other ego agents or environmental agents, onboard a set of infrastructure devices, etc.), information and/or any other inputs.

In a preferred set of variations, the set of inputs in S100 includes information with which to determine state estimates (e.g., position, velocity, and heading angle) for the ego agent and each tracked environmental agent, and optionally a class label associated with each agent (e.g., indicating whether the agent is a vehicle, pedestrian, or other object). Additionally or alternatively, the set of inputs can be used to determine a subset of this information and/or any other information (e.g., acceleration information, geometric properties of the agents, historical information, etc.).

S100 can optionally include pre-processing (e.g., fusing, aggregating, etc.) any or all of the set of inputs, which functions to prepare the set of inputs for analysis in the subsequent processes of the method 200.

Additionally or alternatively, S100 can include any other processes.

4.2 Method—Predicting a Set of Future Scenarios S200

The method 200 preferably includes predicting a set of future scenarios S200, which functions to predict the effect (equivalently referred to herein as impact) that the ego agent implementing a certain policy would have on other agents on the road, such that the ego agent can appropriately select the optimal policy to implement. Additionally or alternatively, S200 can function to enable an assessment of any other metrics (e.g., as described in S300).

S200 is preferably performed in response to S100 and based on the set of inputs received in S100, but can additionally or alternatively be performed based on any processing of the inputs received in S100 and/or any other information (e.g., a route network, road infrastructure information, a set of maps, etc.), based on data received in previous iterations of S100 (e.g., to form a corpus of aggregated historical data), and/or based on any other information. Additionally or alternatively, S200 can be performed absent of S100, multiple times during the method 200, and/or at any other times during the method 200.

S200 is preferably performed at and/or with the computing subsystem, further preferably a computing subsystem onboard the ego agent, but an additionally or alternatively be performed at a remote computing system offboard the ego agent, a combination of computing systems, and/or any other computing subsystem(s).

A set of future scenarios preferably refers to the predicted environment (e.g., surroundings) that the ego vehicle will encounter at one or more time points in the future. This can include and/or reflect, for instance, where (e.g., at which positions) the environmental agents will be at future points in time, where the ego vehicle will be at future points in time, what motion characteristics (e.g., motion parameters) the environmental agents and/or ego agent will have (e.g., speed, acceleration, etc.) at future points in time, the orientation characteristics (e.g., heading angle, angle of orientation, etc.) that the environmental agents and/or ego agent will have in the future, the behaviors and/or actions and/or policies that the environmental agents and/or ego agents will be executing in the future, the control commands (e.g., braking, steering, etc.) that the environmental agents and/or ego agent will be implementing in the future, and/or any other features can be used to prescribe the future scenario(s).

In a set of variations, for instance, the future scenarios represent at least positions associated with environmental agents (e.g., vehicles, pedestrians, other objects, etc.) and the ego agent, and optionally further any or all of: orientations of the agents, motion and/or movement parameters (e.g., speed, acceleration, etc.) of the agents, any derived parameters (e.g., energy, work, etc.), and/or any other information.

Determining a set of future scenarios preferably includes performing a set of simulations, wherein the set of simulations represent potential future scenarios associated with the ego agent's environment. In preferred variations, the set of future scenarios represent the potential future scenarios that would result from the ego agent implementing a particular policy or particular set of policies, such that the effects of implementing these policies can be determined and assessed in order to select which policy (e.g., behavior, action, etc.) the ego agent should implement moving forward. Additionally or alternatively, the set of future scenarios can include those that would result from any or all of: maintaining a current policy, implementing a particular set of control commands, updating a destination of the ego agent, updating a goal or set of objectives of the ego agent, encountering a particular set and/or change in environmental conditions (e.g., traffic conditions, weather conditions, etc.), and/or any other scenarios can be assessed.

The simulations preferably include closed-loop, forward simulations, but can additionally or alternatively include backward simulations, open-loop simulations, and/or any combination of simulations. In a preferred set of variations, the simulations include closed-loop forward simulations, which predict future positions (and/or any other state estimate information or other information) for the environmental agents and optionally the ego agent, and further optionally any other information (e.g., motion information), based on the set of inputs received in S100 (e.g., current observed state estimates, current class labels, historical state estimates and/or historical class labels, etc.). Additionally or alternatively, any other simulations can be implemented.

The agents are preferably simulated for multiple time steps (e.g., $t_1, t_2, \ldots t_n$) during a total time represented by the stimulation (e.g., between 1 and 5 seconds, 1 second, 2 seconds, 3 seconds, 4 seconds, 5 seconds, between 1 and 10 seconds, between 5 and 10 seconds, greater than 10 seconds, etc.), such that a higher granularity of the agent movements can be provided for analysis. Alternatively, the simulations can be associated with a single time step and/or any combination.

In the simulations, the ego agent is preferably assigned a single policy from a potential set of policies, such that the effect of implementing this particular policy can be evaluated, where a policy refers to a behavior/action (and/or associated control commands) (e.g., driving straight, changing lanes, turning right, turning left, stopping, etc.) that the agent could perform. The environmental agents are further preferably each assigned a single policy such that intent estimation can be performed for these agents in the simulation. Additionally or alternatively, simulation the agents can include any or all of the processes described in U.S. application Ser. No. 16/514,624, filed 17 Jul. 2019, and U.S. application Ser. No. 17/365,538, filed 1 Jul. 2021, each of which is incorporated in its entirety by this reference. Further additionally or alternatively, any other assignments can be made to any agents in the simulations (e.g., as described above).

Performing the set of simulations preferably includes, for each ego agent policy, performing a $1^{st}$ subset of simulations and a $2^{nd}$ subset of simulations, where the representation (e.g., presence, behavior, etc.) of the ego agent differs between the first and second subsets of simulations (e.g., ego agent is present in the $1^{st}$ subset of simulations and ego agent is absent in the $2^{nd}$ subset of simulations), such that the effect of the ego agent on the environmental agents can be determined based on this difference. In variations, in which multiple time steps are represented in the simulations, the $1^{st}$ and $2^{nd}$ subsets are preferably effectively paired, such that each subset represents the same time steps for comparison (e.g., as shown in FIGS. 3A-3B, 4, 5, and 6). Additionally or alternatively, the subsets of simulations can be otherwise configured and/or compared.

Additionally or alternatively, S200 can include performing any other number of sets of simulations and/or types of simulations. In examples, for instance, the simulations can differ based on any or all of: whether or not environmental agents are present, which environmental agents are present (e.g., such that the effects of the behaviors of environmental agents on each other can be determined), and/or any other environmental scenarios.

Figure 5:
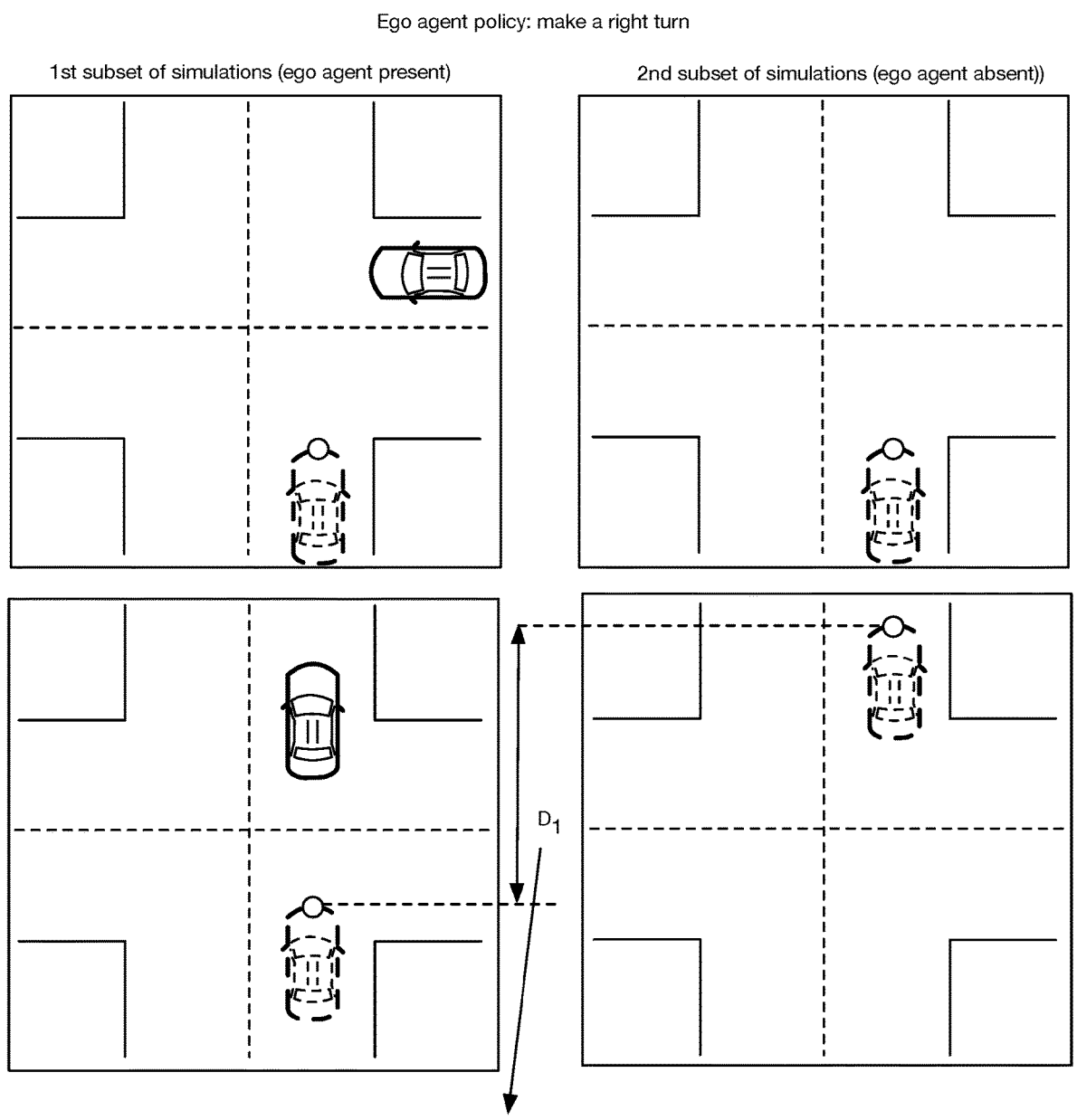
FIG. 5 depicts a specific example of the method for impact-based operation of an autonomous agent involving a right-of-way analysis.
Figure 6:
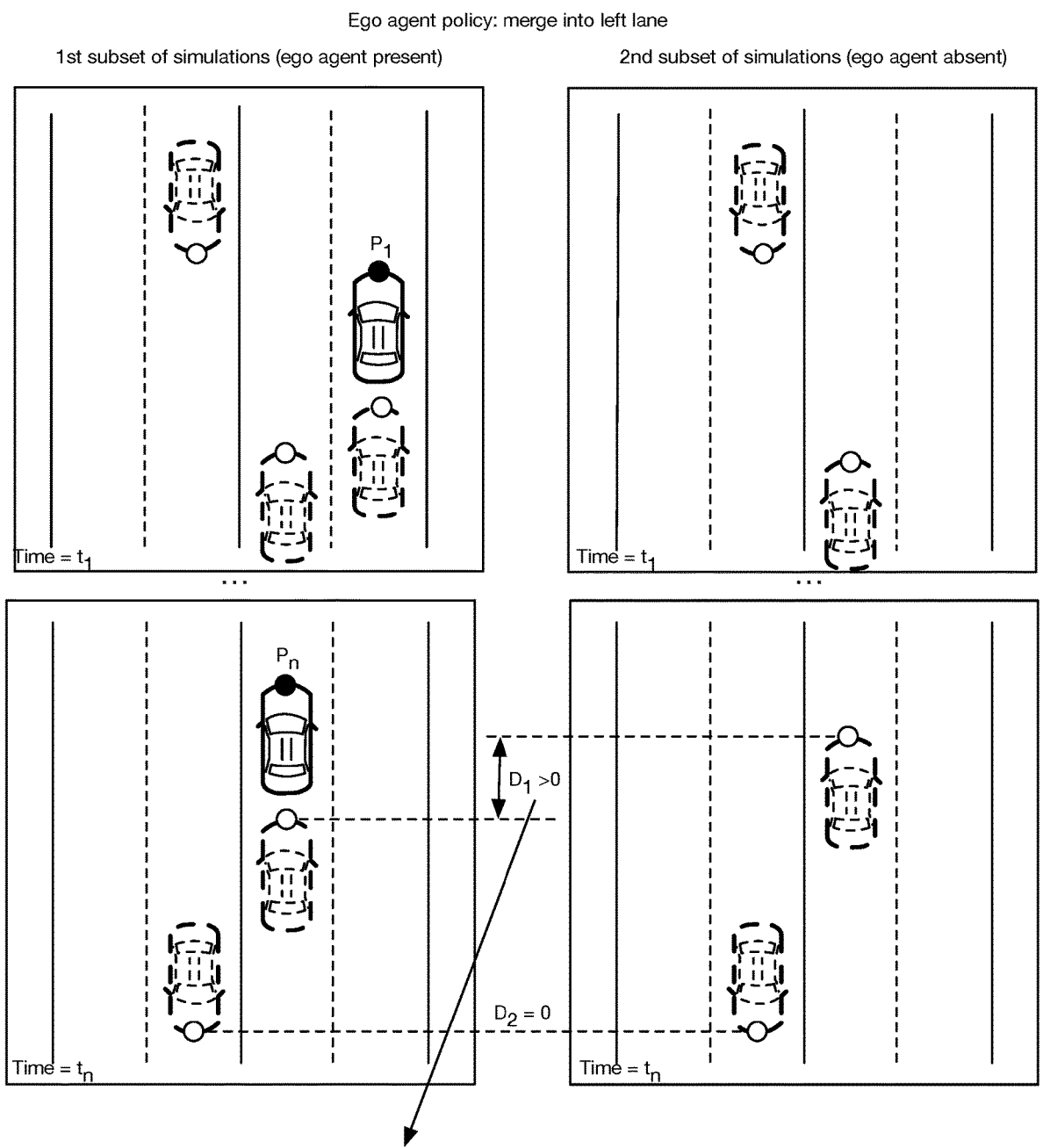
FIG. 6 depicts a specific example of the method for impact-based operation of an autonomous agent involving a trailing environmental agent.

In a first set of variants (e.g., as shown FIGS. 3A-3B, as shown in FIG. 5, as shown in FIG. 6), the $1^{st}$ subset of simulations includes the environmental agents along with the ego agent, where the ego agent executes a proposed future policy, whereas the $2^{nd}$ subset of simulations does not include the ego agent, such that the movement/positions of the environmental agents can be determined in a first scenario where the ego agent executes its policy and then compared with the scenario where the ego agent is not present at all.

Figure 4:
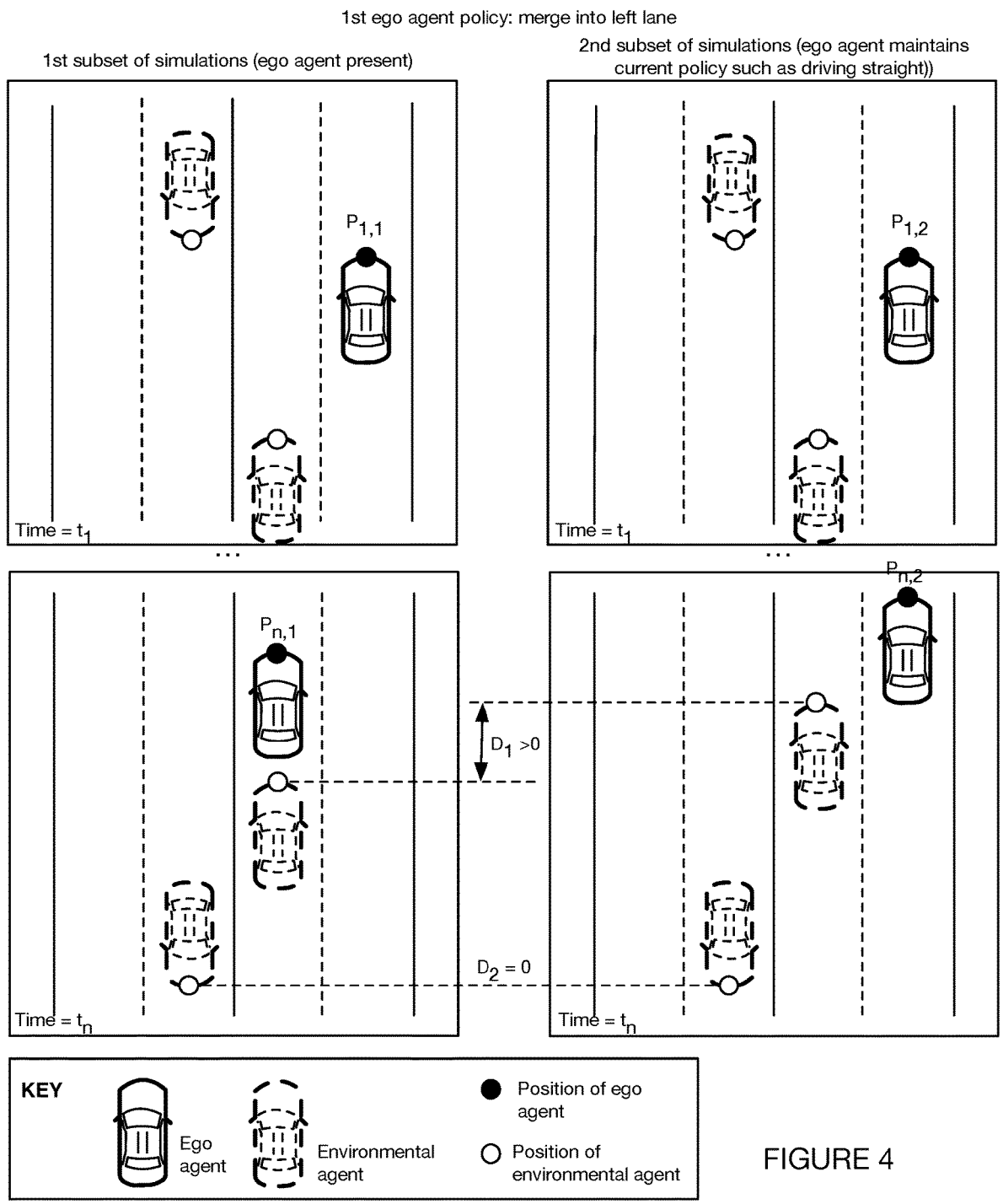
FIG. 4 depicts a variant of the method for impact-based operation of an autonomous agent.

In a second set of variants (e.g., as shown in FIG. 4), the $1^{st}$ subset of simulations includes the environmental agents along with the ego agent, where the ego agent executes a proposed future policy, and the $2^{nd}$ subset of simulations also includes the environmental agents and the ego agent, where the ego agent continues to execute (e.g., maintains) a current policy.

Additionally or alternatively, the agents can be otherwise configured in the subsets of simulations (e.g., ego agent executes different future policy options in each subset, ego agent executes a minimum risk policy in the $2^{nd}$ subset such as driving straight and/or coming to a stop, etc.).

S200 can additionally or alternatively include any other suitable processes.

4.3 Method—Determining a Set of Metrics Based on the Set of Future Scenarios S300

The method 200 includes determining a set of metrics based on the set of future scenarios S300, which functions to assess the potential impact of the ego agent on any or all of the environmental agents. Additionally or alternatively, S300 can function to perform any other analyses, such as determining the risk of executing a certain policy (e.g., collision risk), determining the extent to which executing a certain policy progresses the ego agent toward a certain goal, determining an overall score which is used for policy selection and/or any other decision-making in operation of the ego agent, and/or determining any other metrics involved in selecting a policy for the ego agent to implement.

S300 is preferably performed in response to and/or during (e.g., in parallel with, as part of, etc.) S200, wherein the set of metrics are further preferably determined in accordance with (e.g., during, in response to, etc.) the performance of a set of simulations (e.g., based on features of the future scenarios). Additionally or alternatively, S300 can be performed multiple times during the method 200, and/or at any other times.

The set of metrics preferably includes and/or collectively determines (e.g., through aggregating any or all of the set of metrics described below) a score (e.g., cost function, loss function, etc.) associated with each proposed ego agent policy based on the set of simulations performed for that proposed policy, wherein the policy which is ultimately selected for implementation at the ego agent is determined at least in part based on the score (e.g., based on comparing scores associated with multiple policy options). Additionally or alternatively, the set of metrics described below can be individually determined and/or analyzed, other metrics can be determined, the metrics can be aggregated in other suitable ways, and/or the metrics can be otherwise configured. Further additionally or alternatively, a policy can be selected based on individual metrics and/or based on any other information.

S300 preferably includes determining (e.g., calculating) a reward metric and/or set of reward metrics S310 (e.g., which can be used in the calculation of the overall score), wherein the reward metric functions to determine how (and/or to what extent) goals of the ego agent and/or environmental agents may be affected (e.g., progressed, inhibited, etc.) in the future by the ego agent implementing certain behaviors (e.g., policies). Additionally or alternatively, S300 can be performed in absence of calculating a reward metric.

Determining the reward metric preferably includes determining (e.g., calculating) an environmental agent goal metric (equivalently referred to herein as an impact metric and/or environmental agent reward metric and/or goodness metric) S314 and/or a set of environmental goal metrics (e.g., one for each tracked environmental agent, one for each environmental agent perceived by sensors of the ego agent, etc.), wherein the environmental agent goal metric represents the progress of one or more environmental agents toward a goal (or inversely, the lack of progress toward a goal). The environmental agent goal metric further preferably represents and/or is determined based on the impact that the ego executing a certain policy has on the environmental agent. In a preferred set of variations, for instance, the environmental agent goal metric quantifies the impact that the ego agent's execution of a particular policy is predicted to have on the environmental agent. Additionally or alternatively, the environmental agent goal metric can take into account and/or represent any other information.

In preferred variations, for instance, the impact of the ego agent on the environmental agents is assessed (e.g., quantified, characterized as negative vs. positive vs. neutral) based on if and/or the extent to which the ego agent is predicted to inhibit the environmental agents from reaching one or more goals (e.g., predicted goals, assigned goals, etc.). In preferred examples, this impact is determined, at least in part based on comparisons of metrics between the $1^{st}$ and $2^{nd}$ subset of simulations, but can additionally or alternatively be determined based on metrics from only the $1^{st}$ subset, from only the $2^{nd}$ subset, from other simulation types, and/or from any combination of simulations.

The goal(s) can be the same for all environmental agents, different between environmental agents, and/or environmental agents can be otherwise associated with any other goals and/or combination of goals.

Each environmental agent can be associated with a single goal, multiple goals, and/or any number or combination of goals.

The environmental agent goal is preferably associated with (e.g., includes, is characterized by, etc.) progression of an environmental agent toward a predicted and/or perceived destination, such as progression of the environmental agent along the road(s) on which it is traveling (e.g., in the direction it is currently traveling, in any direction, etc.) and/or on which it could travel. In a set of examples, this can be quantified (e.g., in part, fully, etc.) by a distance that the environmental agent is able to progress in a certain period of time into the future (e.g., as represented by the forward simulations).

Additionally or alternatively, any other position-based metrics and/or derivatives of position-based metrics and/or modified position-based metrics (e.g., scaled distances) can be used in determining the environmental agent goal metric.

In some variations, for instance, the environmental agent goal (and associated environmental agent goal metric) is associated with a distance able to be traveled by the agent in the simulation time frame, which can correspond to a goal of making progress toward a destination. Additionally or alternatively, the goal can include a collision avoidance goal (e.g., including "close call" events), a distance maintenance goal (e.g., between itself and other agents), and/or any other goals.

Additionally or alternatively, the environmental agent goal metric can include and/or be determined based on one or more motion parameters, such as, but not limited to: speed (e.g., for goals of maintaining a constant speed, not decreasing in speed, not decreasing in speed by more than a predetermined threshold and/or rate, refraining from changing in speed above a predetermined rate, not coming to a stop, etc.); acceleration (e.g., maintaining a constant acceleration, preventing a deceleration, preventing an acceleration and/or deceleration of more than a predetermined rate and/or amount, etc.); jerk; and/or any other motion parameters.

The environmental agent goal metric can additionally or alternatively be determined based on derived motion parameters (e.g., derivatives of motion parameters), modified motion parameters (e.g., scaled derivatives of motion parameters), aggregated motion parameters, and/or any other parameters.

As such, motion-based environmental goal metrics can include and/or be determined based on, for instance, any or all of: velocity-based parameters (e.g., velocity, derivative of velocity, scaled velocity, etc.); acceleration-based parameters (e.g., acceleration, derivative of acceleration, jerk, scaled acceleration, etc.); energy and/or modified energy parameters (e.g., kinetic energy, modified/scaled kinetic energy, potential energy, modified/scaled potential energy, kinematic and/or dynamic parameters, etc.), work and/or modified work parameters, power, and/or any other parameters.

In some variations, for instance, the $1^{st}$ and $2^{nd}$ subset simulations enable a difference in energy (e.g., modified kinetic energy, velocity-squared, etc.) and/or work (e.g., the work that the environmental agent is required to perform to get to the future scenario, the work that the environmental agent is required to perform to avoid a collision in the future scenario, etc.) to be determined, which reflects how much energy and/or work the agent is required to expend (e.g., in slowing down, in stopping, in avoiding a collision, etc.) based on actions of the ego agent. If, for instance, a proposed policy of the ego agent would require the environmental agent to slam on the brakes to avoid hitting the ego agent or another object, the amount of work required to stop can be calculated and used to quantify the ego agent's inhibiting of that environmental agent reaching a goal (e.g., minimizing energy and/or work expenditure).

Additionally or alternatively, the environmental agent goal metric can include and/or be determined based on one or more orientation parameters, such as, but not limited to a heading of the environmental agent (e.g., for goals of minimizing a change in heading, for goals of minimizing the difference between a heading angle of the agent and a direction of traffic [e.g., direction of lane line] as a large angle could indicate that the environmental agent has swerved, etc.) and/or any other metrics.

Additionally or alternatively, the environmental agent goal metric can include and/or be determined based on one or more location parameters, such as location parameters which indicate the vehicle's location relative to (e.g., distance to) other agents and/or road geometry and/or other environmental features (e.g., static objects). In some variations, for instance, a location of the environmental agent within a shoulder or other undesirable area can indicate that the environmental agent has been inhibited (e.g., decrease/down-weight its environmental agent goal metric value). Other locations which can be checked can include, but are not limited to, non-roadway locations (e.g., sidewalks, grass, etc.), locations which coincide with other objects, and/or any other locations.

Additionally or alternatively, the environmental agent goal metric can include and/or be determined based on the environmental agent's predicted level of adherence to any or all of: traffic rules, road etiquette, and/or any other features. For instance, in an event that actions of the ego agent would cause the environmental agent to disobey traffic rules and/or road etiquette, the environmental agent goal metric can be decreased in value and/or the proposed policy for the ego agent otherwise penalized. Additionally or alternatively, the environmental agent goal metric can be determined based on any combination of parameters and/or metrics (e.g., as described above), such as: according to an equation, according to a weighted and/or scaled equation, averaged, summed, and/or otherwise combined.

In a first set of variations, the environmental agent goal metric is associated with (e.g., determined based on, quantified based on, etc.) a travel distance parameter associated with each tracked environmental agent, where the travel distance parameter can have any or all of the following advantages: being comparable among different agents and/or different types of agents, linearly scaling other metrics, and/or any other advantages. The travel distance parameter is preferably calculated based on the difference between the distance the environmental agent is able to travel in the $1^{st}$ subset of simulations as compared with the distance the environmental agent is able to travel in the $2^{nd}$ subset of simulations (e.g., as represented by D1 and D2 in FIGS. 3A-3B, 4, 5, and 6). The parameter can be calculated for each of a set of time steps represented in the simulations, aggregated over all time steps, used to determine an average difference (or maximum difference, median difference, etc.), and/or otherwise calculated. The parameter can optionally include a ratio of the distance in the $1^{st}$ subset of simulations to the distance in the $2^{nd}$ subset of simulations and/or the inverse of this ratio, such that the ratio can serve as a weight to scale other metrics (e.g., as described below for the reward metric). Additionally or alternatively, the parameter can be the difference in these distances and/or any parameter determined based on these distances.

In specific examples, the travel distance parameter is a scaling factor for other metrics and/or a collective set of metrics (e.g., in determining a cost function, in determining a loss function, in determining a policy score, etc.), which can be applied to multiple different types of agents, such as vehicles, pedestrians, and optionally others. In these cases, if, for instance, a pedestrian in the simulation is moving and then stops (which could happen due to the ego agent or due to a variety of unrelated circumstances), the distance will be relatively small—so even though they might come to a complete stop, it will have a relatively low contribution to the overall metric (e.g., as compared to a vehicle coming to a complete stop).

Additional or alternative to the travel distance parameter, the environmental agent goal metric can be determined based on any or all of: other distance parameters, motion parameters (e.g., change in acceleration between subsets of stimulations, change in velocity between subsets of simulations, etc.), and/or any other parameters. In variations involving motion parameters and/or any other parameters, the parameters could optionally be scaled or otherwise adjusted based on agent type (e.g., pedestrians vs. cars).

In a second set of variations, the environmental agent goal metric is determined (e.g., equal to, calculated based on, etc.) based on an analysis of the change in energy and/or work expenditure associated with the environmental agent in response to the ego agent (e.g., as the ego agent executes a particular policy). In examples, a difference in modified kinetic energy (e.g., velocity-squared) of the environmental agent between the $1^{st}$ and $2^{nd}$ subset of simulations is used to calculate (e.g., form) the environmental agent goal metric. If for instance, the change in modified kinetic energy of the environmental agent over time differs greatly between the $1^{st}$ and $2^{nd}$ subsets of simulations (e.g., indicating that the environmental agent has drastically slowed down, indicating that the environmental agent is involved in collision, etc.), the environmental agent goal metric can reflect this. In additional or alternative examples, for instance, the difference in work required to be exerted by the environmental agent to reach its future state between the $1^{st}$ and $2^{nd}$ subsets of simulations can be determined and used as (and/or to determine) the environmental agent goal metric. If, for instance, a proposed policy for the ego agent would result in the environmental agent needing to exert a high amount of work in reaction (e.g., to not hit the ego agent, to not hit another object, to maintain a predetermined distance relative to other agents, etc.), the environmental agent goal metric can reflect this.

Any or all of the environmental agent goal metrics (and/or other metrics, aggregated metrics, an overall score, etc.) can optionally be determined (e.g., scaled) based on any or all of: a class label of the environmental agent (e.g., pedestrian vs. vehicle, vehicle vs. cyclist, etc.); a proximity of the environmental agent relative to the ego agent (e.g., wherein objects closest to the vehicle are associated with higher potential impacts) and/or other agents; and/or any other features.

In some variations, for instance, determining the environmental agent goal metric can optionally include scaling the environmental agent goal metric based on any number of environmental features, agent features, and/or circumstances.

In some examples, such as those in which the ego agent is removed from the $2^{nd}$ subset of simulations, a scaling factor can be applied to parameters (e.g., travel distance parameters) associated with environmental agents which are behind (e.g., directly behind, in a different lane but with an intent to change lanes behind the ego agent, etc.) the ego agent, these environmental agents referred to herein as trailing agents. This can function, for instance, to reduce an artificially elevated gain in travel distance on the trailing agent which results from the simulated trailing agent's ability to occupy the spot of the ego agent in the $2^{nd}$ subset of simulations.

In additional or alternative examples, a scaling factor can be applied to parameters associated with environmental agents in situations in which the ego agent has the right-of-way, such that any impact on environmental agents can be minimized or eliminated. Alternatively, parameters can not be calculated, made equal to a constant (e.g., ratio of 1, travel distance difference of 0 between subsets of simulations, etc.), and/or otherwise adjusted. In a specific example in which the ego agent has right of way at a 4-way stop (e.g., as shown in FIG. 5), the impact on the other environmental agents waiting to go can be eliminated and/or mitigated. This can function to prevent, for instance, the ego agent from being stopped for a long period of time and/or causing confusion to the other agents.

In additional or alternative examples, a scaling factor can be applied which takes into account temporal information, such as a time which has progressed since the ego agent has last moved and/or any other time(s) (e.g., time since ego agent has last implemented a new policy). This can function to help the ego agent still drive with a human-like level of aggression and/or initiative, thereby enabling the ego agent to best mimic human driving and/or make progress toward its destination. In a set of specific examples, for instance, an ego agent is stopped at a crosswalk where a large crowd is slowly and continuously crossing (e.g., after having just been let out of a concert). As the ego agent waits longer and longer (e.g., as subsequent election cycles pass), the parameters associated with the pedestrians can be continuously scaled, such that it does not penalize as highly for negatively impacting progress of the pedestrians (e.g., thereby allowing the ego agent to nudge forward and signal to the crowd that it is going to cross).

The parameters associated with the tracked environmental agents in each simulation and used to determine the environmental agent goal metrics can optionally be aggregated among/between multiple environmental agents to determine an overall environmental agent goal metric associated with that particular set of simulations (e.g., aggregated for all environmental agents in that particular predicted scenario). Aggregating the parameters preferably includes determining a maximum parameter among the tracked environmental agents, thereby indicating the maximum impact that the ego agent has on its environment. Additionally or alternatively, the parameters can be otherwise aggregated (e.g., calculated as an average impact, calculated as a median impact, etc.). Further additionally or alternatively, an environmental agent goal metric can be calculated for each environmental agent (e.g., used to calculate a reward metric and/or cost function for each environmental agent) and/or otherwise suitably determined.

Determining the reward metric can further include determining an ego agent goal metric S312, wherein the ego agent goal metric (equivalently referred to herein as an ego progress metric and/or an ego reward metric) functions to represent the ego agent's progress toward a goal.

The ego agent goal metric can be the same type of metric(s) as that used for the environmental agent goal metrics (e.g., such that they can be easily aggregated in determining an overall policy score), different than those used for the environmental agents (e.g., to reflect a different goal of the ego agent), and/or any combination of metrics.

In some variations, for instance, the ego agent goal and/or ego agent goal metric is able to be more directly and/or definitively determined (e.g., associated with a higher degree of confidence) relative to any or all of the environmental agent goals and/or associated environmental agent goal metrics, since the ego agent can have a higher awareness of its own goals (e.g., the particular destination it is traveling to, the particular temporal metrics it is trying to hit for transporting users and/or goods, traffic rules and thresholds it is constrained to obey, performance metrics it is attempting to achieve, collision avoidance, etc.). In some variations, for instance, the ego agent goal metric represents progress toward a destination where the destination is determined (e.g., received directly from) a planning and/or routing subsystem of the ego agent.

In a first set of variations, the ego agent goal is associated with progress (e.g., in distance traveled, in time to reach, etc.) toward a destination, but can additionally or alternatively include and/or represent any other types of goals. The ego agent goal metric can be calculated based on the set of simulations (e.g., in the same or similar way as the environmental agent goal metric, based only on the is subset of simulations, etc.), based on other simulations, and/or based on any other information.

In a second set of variations, the ego agent goal is additionally or alternatively associated with an amount of energy and/or work required to be exerted by the ego agent in executing a particular policy.

In some examples, for instance the ego agent goal metric represents an amount of energy and/or work expended by the ego agent in reaching its destination. The ego agent goal metric can function, for instance, to penalize policies (e.g., in the overall score) that increase this amount of energy and/or work. Additionally, the ego agent goal metric can be scaled and/or otherwise calculated based on various heuristics (e.g., which effectively apply forces to the ego agent), such as: repulsive forces (e.g., which increase the required energy/work) if the ego agent crosses a lane line (e.g., a double yellow solid lane line) and/or otherwise violates a traffic rule, courtesy, or other criteria.

In a third set of variations, the ego agent goal is additionally or alternatively associated with one or more comfort criteria (e.g., in use cases in which the ego agent is transporting passengers, for an ego agent functioning as a shuttle, etc.), such as, but not limited to: minimizing sudden accelerations and/or decelerations (e.g., keeping these below a predetermined threshold), minimizing and/or avoiding jerk, and/or any others.

The environmental agent goal metric (e.g., individual environmental agent goal metric, aggregated environmental agent goal metric, etc.) is preferably aggregated with (e.g., used to scale) the ego agent goal metric, where the combination determines an overall reward metric (e.g., decrease the ego agent goal metric if environmental agents are negatively impacted). Additionally or alternatively, the reward metric can be otherwise suitably determined.

S300 can optionally include determining a success metric S320, which preferably reflects (e.g., quantifies) the likelihood (e.g., probability) that the ego agent can successfully execute a particular proposed policy (e.g., the policy being simulated). The success metric is preferably determined based on (and/or equal to) a collision metric, where successful execution of a particular proposed policy can be defined based on any or all of: avoiding a collision and/or a collision risk, avoiding a collision above a certain severity threshold (e.g., above a predetermined energy threshold, above a predetermined modified kinetic energy threshold, above a predetermined work threshold corresponding to the work required to prevent the collision, etc.), maintaining a collision risk below a predetermined threshold (e.g., 5% likelihood, 10% likelihood, 20% likelihood, between 0-10% likelihood, etc.), and/or any other collision features. Determining the collision metric S322 is preferably performed based on the is subset of simulations in which the ego agent is simulated together with the environmental agents (e.g., to detect collisions between any or all of these agents), but can additionally or alternatively be determined based on any other simulations and/or information.

Additionally or alternatively, the success metric can reflect any other performance criteria, such as, but not limited to: comfort criteria (e.g., maintaining acceleration changes below a predetermined threshold, maintaining jerk below a predetermined threshold, maintaining velocity changes below a predetermined threshold, maintaining braking rates below a predetermined threshold, etc.), traffic rule criteria, and/or any other criteria.

In a preferred set of variations, the success metric is determined based on (e.g., equal to) the probability of a collision occurring if the ego agent executes a particular policy.

In another set of variations, the success metric is additionally or alternatively determined based on the predicted severity (e.g., in terms of modified kinetic energy, in terms of kinetic energy, based on whether the environmental agent is a pedestrian vs. a vehicle vs. a static object, etc.) of the collision.

S300 can optionally include aggregating any or all of the set of metrics (e.g., for each set of simulations), which functions to determine an overall score (e.g., cost function, loss function, etc.) associated with each proposed policy for the ego agent. In a preferred set of variations, a reward metric is determined, which combines the environmental agent goal metric with the ego agent goal metric, where the reward metric can be further aggregated with (e.g., multiplied with) the probability of success metric to determine the overall score (e.g., where the cost function is the inverse of a loss function, where the cost function is calculated by subtracting the loss metric from 1, etc.). In some variations, for instance, the success metric effectively functions to scale down the reward metric such that policies which may be high reward, but also high risk, are not automatically implemented. Additionally or alternatively, the metrics can be otherwise aggregated and/or otherwise used to determine any suitable metrics.

Additionally or alternatively, S300 can include any other suitable processes.

4.4 Method—Operating the Ego Agent Based on the Set of Metrics S400

The method 200 can optionally include operating the ego agent based on the set of metrics, which functions to operate the ego agent according to a most optimal policy as determined based on the set of metrics in S300. Additionally or alternatively, S400 can perform any other suitable functions.

Figure 8:
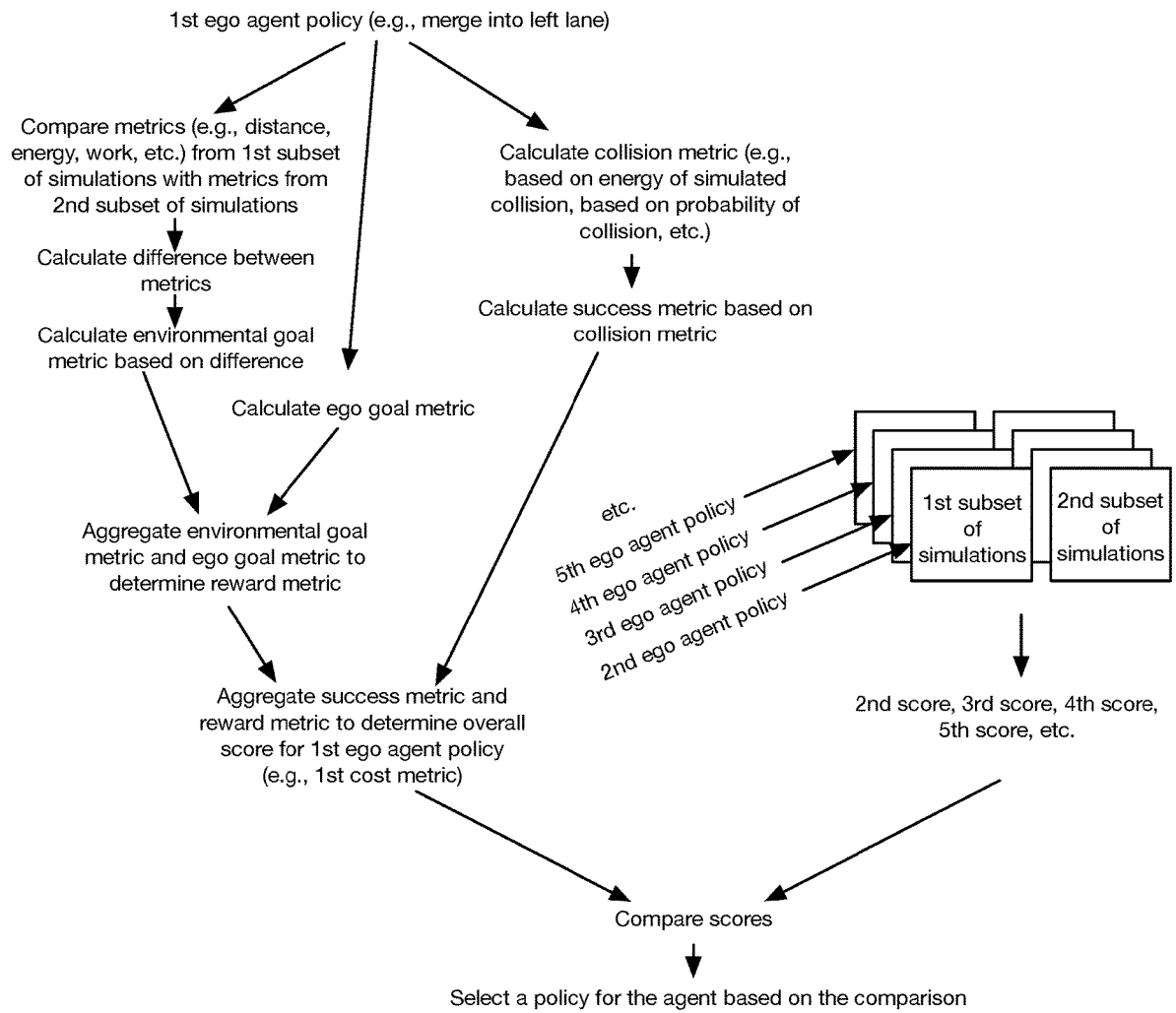
FIG. 8 depicts a variant of the calculation of a set of metrics used in selecting a policy for the autonomous agent to implement.

S400 can optionally include comparing aggregated metrics (e.g., cost functions, as shown in FIG. 8) among different sets of simulations, where each of these sets of simulations corresponds to a particular proposed policy for the ego agent, such that an optimal policy can be selected for the ego agent to implement (e.g., policy associated with a minimum cost function).

In a preferred set of variations, for instance, S400 includes selecting and implementing a policy which is associated with a highest overall score.

In another set of variations, S400 includes selecting an implementing a policy which is associated with a minimal cost.

Additionally or alternatively, the ego agent can be otherwise suitably operated (e.g., maneuvered).

Additionally or alternatively, a policy for the ego agent can be otherwise selected and/or S400 can include any other suitable processes.

5. Variations

Figure 7:
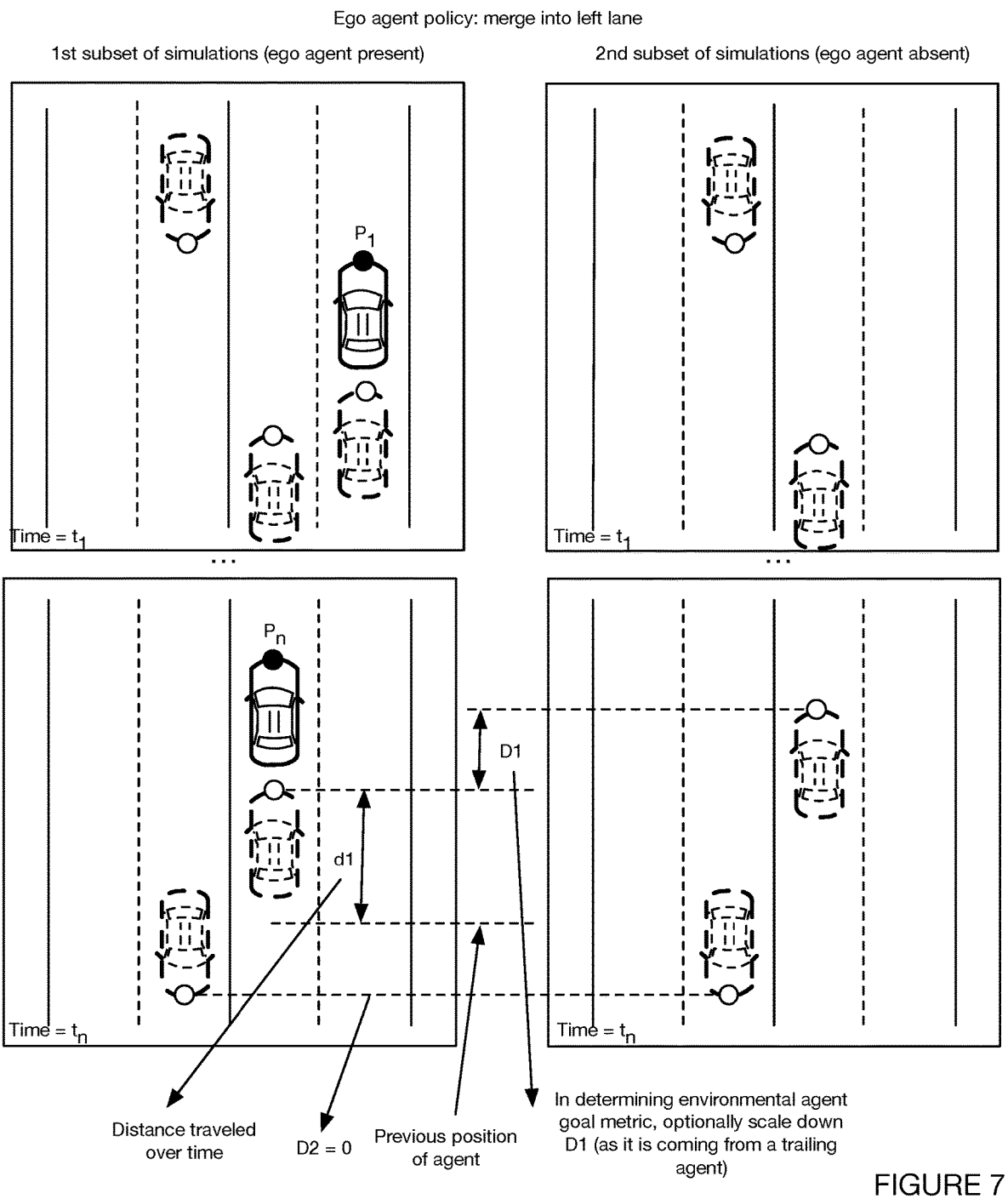
FIG. 7 depicts a variant of the assessment of the impact of an autonomous agent on environmental agents.

In a first set of variants of the method 200 (e.g., as shown in FIG. 7), an environmental agent goal metric (equivalently referred to herein as an impact score) is determined based on a set of distance differences between the $1^{st}$ and $2^{nd}$ subset of simulations. As shown in FIG. 7, for instance, a metric D1 which represents the difference in final future position with and without the ego agent can be used to determine how much the ego agent implementing the proposed policy would impede the environmental agent from progressing along the roadway. In examples, for instance, the environmental agent goal metric is equal to D1 and/or a scaled version of D1 (e.g., to indicate that the environmental agent is trailing the ego agent) and/or a metric which is determined based on D1 (e.g., a ratio of D1 relative to d1, a ratio of (D1+d1) relative to d1, etc.). In a specific example, for instance, d1 represents the distance that the environmental agent is expected to travel with the ego agent present, where D1 can be aggregated with d1 to determine the environmental agent goal metric.

The environmental agent goal metric (equivalently referred to herein as an impact score) can optionally be used to effective scale down an overall reward metric (e.g., aggregated environmental agent goal metric and ego agent goal metric), such as when the environmental agent goal metric represents the negative impact that the ego agent is predicted to have on the environmental agent. Additionally or alternatively, the environmental agent goal metric could increase the value of the reward metric if the ego agent has a positive impact on the environmental agent (e.g., opens up the roadway to the environmental agent).

In a set of examples, the distances and/or velocities associated with the environmental agents can further be used in the calculation of an energy metric (e.g., modified kinetic energy, velocity-squared calculation, etc.) and/or work metric for the environmental agents, where the environmental agent goal metric (equivalently referred to herein as an impact score) is calculated based on the energy metric and/or the work metric.

Figure 9A:
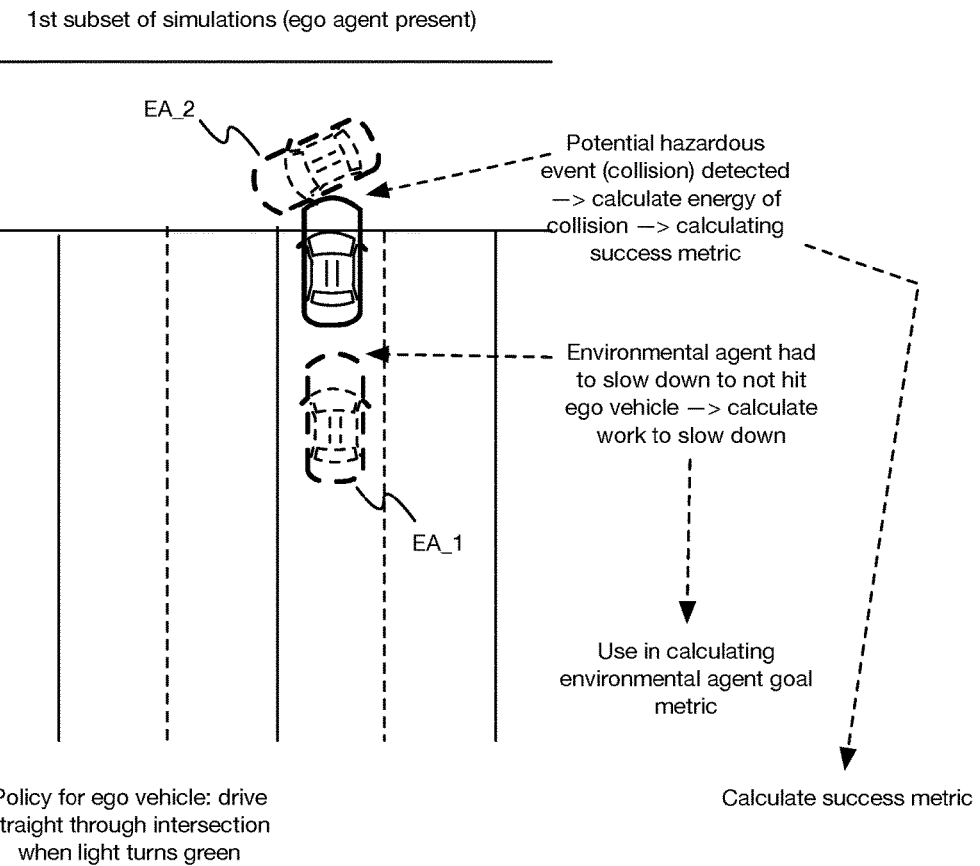
FIGS. 9A-9B depict a variation of the method for impact-based operation of an autonomous agent.
Figure 9A:
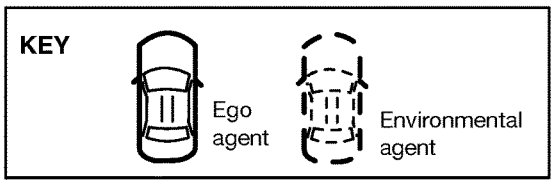
Figure 9B:
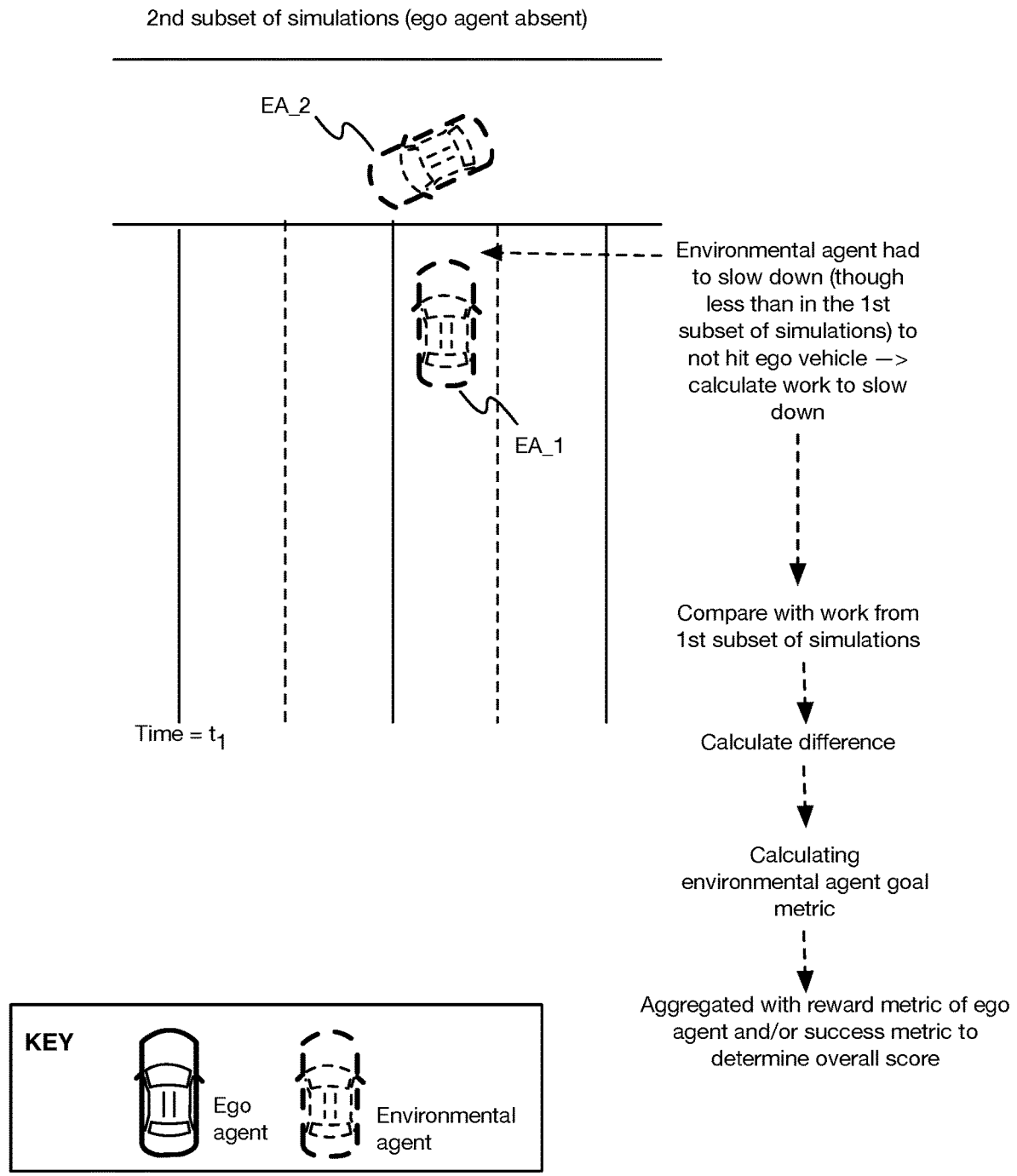

In a second set of variants of the method 200 (e.g., as shown in FIGS. 9A-9B), the environmental agent goal metric is calculated based on a set of energy and/or work metrics, which quantify how much energy and/or work would need to be spent by the environmental agents in response to the ego agent executing a particular policy (e.g., relative to if the ego agent was not present).

Additionally or alternatively, the method 200 can be otherwise suitably performed.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for impact-based operation of an autonomous vehicle, the method comprising:
    collecting data from a set of sensors associated with the autonomous vehicle;
    detecting a set of environmental objects in an environment of the autonomous vehicle based on the data;
    performing a set of forward simulations comprising representations of the set of environmental objects, the set of forward simulations comprising:
        a $1^{st}$ subset of simulations, comprising multiple simulations, wherein in the $1^{st}$ subset of simulations, a representation of the autonomous vehicle is present;
        a $2^{nd}$ subset of simulations, comprising multiple simulations, wherein the multiple simulations of the $2^{nd}$ subset differ in an estimated intent assigned to the set of environmental objects represented in the multiple simulations, wherein in each of the $2^{nd}$ subset of simulations, the representation of the autonomous vehicle is absent;
    determining an impact score of the ego vehicle on the environment, comprising:
        calculating a $1^{st}$ set of metric values based on the $1^{st}$ subset of simulations;
        calculating a $2^{nd}$ set of second metric values based on the $2^{nd}$ subset of simulations;
        comparing the $1^{st}$ set of metric values with the $2^{nd}$ set of metric values; and
        determining the impact score based on the comparison;
    operating the ego vehicle based on the impact score.

2. The method of claim 1, wherein comparing the $1^{st}$ set of metric values with the $2^{nd}$ set of metric values comprises calculating a difference between the $1^{st}$ set of metric values and the $2^{nd}$ set of metric values, wherein the difference represents a quantified impedance of progress of the environmental objects as caused by the autonomous vehicle.

3. The method of claim 2, wherein each of the $1^{st}$ and $2^{nd}$ sets of metric values is determined based on a derivative of velocity of the environmental objects in the set of forward simulations.

4. The method of claim 2, wherein each of the $1^{st}$ and $2^{nd}$ sets of metric values is determined based on a distance traveled by the environmental objects in the set of forward simulations.

5. The method of claim 2, further comprising applying a scaling factor to the difference based on a set of features associated with the set of environmental objects.

6. The method of claim 5, wherein the set of features comprises at least one of: a determination an environmental object of the set of environmental objects does not have a right-of-way privilege in a scenario present in the set of forward simulations; a determination that the environmental object is arranged behind the autonomous vehicle; and a determination that the environmental vehicle is located above a predetermined distance threshold from the autonomous vehicle.

7. The method of claim 6, wherein the scaling factor decreases the value of the difference.

8. The method of claim 1, further comprising determining a set of multiple impact scores, wherein the set of multiple impact scores comprises the impact score, wherein operating the autonomous vehicle based on the impact score comprises selecting a policy from a set of multiple policy options for the autonomous vehicle based on the set of multiple impact scores.

9. The method of claim 8, wherein the policy is further selected based on a reward score associated with the autonomous vehicle, wherein the reward score represents the progress of the autonomous vehicle relative to an autonomous vehicle goal.

10. The method of claim 9, wherein the autonomous vehicle goal comprises a distance to a destination of the autonomous vehicle.

11. The method of claim 9, wherein the autonomous vehicle goal comprises an amount of work exerted by the autonomous vehicle to reach a destination associated with the autonomous vehicle.

12. The method of claim 1, wherein the environmental objects comprise a set of vehicles and a set of pedestrians located in a field-of-view of the set of sensors.

13. A system for impact-based operation of an autonomous vehicle, the system comprising:
   a data collection subsystem comprising a set of sensors;
   a computing subsystem comprising a memory and a processor in communication with the data collection subsystem, wherein the computing subsystem:
   collects data from the data collection subsystem;
   processes the data to detect a set of environmental objects in an environment on the autonomous vehicle;
   a simulator that performs a set of forward simulations, the set of forward simulations comprising:
   a $1^{st}$ subset of simulations, comprising multiple simulations, wherein in the $1^{st}$ subset of simulations, a representation of the autonomous vehicle is present;
   a $2^{nd}$ subset of simulations, comprising multiple simulations, wherein the multiple simulations of the $2^{nd}$ subset differ in an estimated intent assigned to the set of environmental objects represented in the multiple simulations, wherein in each of the $2^{nd}$ subset of simulations, the representation of the autonomous vehicle is absent;
   a controller configured to maneuver the autonomous vehicle based on a set of instructions received from the computing subsystem, wherein the computing subsystem:
   determines the set of instructions based on an impact of the autonomous vehicle on the set of environmental objects, wherein determining the impact comprises:
   calculating a $1^{st}$ set of metric values based on the $1^{st}$ subset of simulations;
   calculating a $2^{nd}$ set of second metric values based on the $2^{nd}$ subset of simulations;
   comparing the $1^{st}$ set of metric values with the $2^{nd}$ set of metric values; and
   determining the impact based on the comparison.

14. The system of claim 13, wherein the simulator is part of the computing subsystem.

15. The system of claim 14, wherein the computing subsystem is located onboard the autonomous vehicle.

16. The system of claim 13, wherein the simulator performs the set of forward simulations throughout a trip of the autonomous vehicle.

17. The system of claim 16, wherein simulations of the set of forward simulations are performed according to a predetermined frequency.

18. The system of claim 13, wherein comparing the $1^{st}$ set of metric values with the $2^{nd}$ set of metric values comprises calculating a difference between the $1^{st}$ set of metric values and the $2^{nd}$ set of metric values, wherein the difference represents a quantified impedance of progress of the environmental objects as caused by the autonomous vehicle.

19. The system of claim 18, wherein each of the $1^{st}$ and $2^{nd}$ sets of metric values is determined based on a derivative of velocity of the environmental objects in the set of forward simulations.

20. The system of claim 18, wherein each of the $1^{st}$ and $2^{nd}$ sets of metric values is determined based on a distance traveled by the environmental objects in the set of forward simulations.

* * * * *